Patented Apr. 20, 1937

2,077,548

UNITED STATES PATENT OFFICE 2,077,548

PRODUCTION OF DINAPHTHYLENE OXIDE

George Roger Clemo and Joseph George Cockburn, Newcastle-on-Tyne, England, assignors to Imperial Chemical Industries Limited, a corporation of Great Britain No Drawing. Application March 9, 1932, Serial No. 597,801. In Great Britain March 17, 1931

2 Claims. (Cl. 260—54)

This invention relates to naphthalene derivatives, more particularly dinaphthylene oxides, and a process for the manufacture thereof.

Two dinaphthylene oxides are at present known, namely 1:1'-dinaphthylene 2:2'-oxide (Formula I) commonly called dinaphthylene oxide, and an isomeride, which is probably 1:2'-dinaphthylene 2:3'-oxide (Formula II) and which is called isodinaphthylene oxide

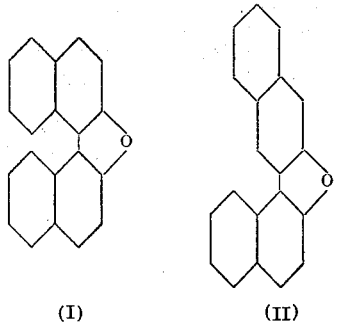

(I)        (II)

The isodinaphthylene oxide has recently been prepared by heating β-naphthol with a little calcium oxide at 270°–340° C.

It is an object of the present invention to produce dinaphthylene oxides of the character above described and substituted derivatives thereof. A further object is the provision of a new and improved process for producing these compounds. A more specific object is the production of isodinaphthylene oxide by a reaction which proceeds with great smoothness and results in higher yields than heretofore attainable. Another specific object of the invention is the production of substituted isodinaphthylene oxides. Other objects will appear hereinafter.

These objects are accomplished according to the invention whereby dinaphthylene oxides or their substitution derivatives are produced by reacting di-β-naphthol or a substituted derivative thereof with β-naphthol or a substituted derivative thereof at an elevated temperature and in the presence of an oxide or hydroxide of an alkaline earth metal or zinc or magnesium or of a mixture containing two or more of these oxides or hydroxides. The resultant dinaphthylene oxides or their substitution products may be recovered in any suitable manner.

In particular we have found that when the reaction of di-β-naphthol, i. e., 2:2'-dihydroxy-1:1'-dinaphthyl, with β-naphthol is effected in the presence of calcium oxide or hydroxide isodinaphthylene oxide is produced in good yield (60% or more based on the di-β-naphthol). In the presence of barium oxide or hydroxide there is also produced some of the ordinary dinaphthylene oxide (Formula I). In the presence of zinc oxide or hydroxide the ordinary dinaphthylene oxide is formed, with little or no isodinaphthylene oxide. Mixtures of the metal hydroxides and oxides may also be employed.

The invention will be further illustrated but is not limited by the following examples, in which the parts are by weight.

Example I

Thirty parts of β-dinaphthol are gradually added to a mixture of 5 parts of β-naphthol and 1 part of calcium oxide and the mixture heated in an open vessel to a temperature of 300° C. in about 30 minutes. The liquid melt is allowed to cool somewhat and then poured in a thin stream into 300 parts of boiling, 8% aqueous sodium hydroxide. The insoluble portion is collected on a filter, washed free from alkali, dried and distilled.

The distillate consists of pure isodinaphthylene oxide.

Example II

Five parts of β-naphthol are boiled for 5 minutes with one part of calcium oxide, and 30 parts of di-β-naphthol are then added during 50 minutes, the temperature being allowed to rise to about 345° C. The melt is boiled for about 2 hours, and then poured into 300 parts of a 10% caustic soda solution, boiled for 15 minutes, and then filtered. The insoluble material is washed, dried, and purified by distillation under low pressure.

Example III

Five parts of β-naphthol and 1 part of magnesium oxide are boiled together for 5 minutes and 30 parts of di-β-naphthol added over approximately ½ hour. The mixture is boiled for a further 2 hours and then poured hot into excess caustic soda solution and boiled for a few minutes. The insoluble material can be purified in any suitable manner, e. g., by distillation and consists of substantially the same product as that of Example I.

Example IV

Ten parts of dibromo-di-β-naphthol, 1.7 parts of β-naphthol and 0.5 part of hydrated calcium oxide are heated for 1½ hours to 360° C. and the melt poured into excess of hot, dilute caustic soda solution. The mixture is boiled for a few minutes and the solid filtered off, washed and dried. After purification, for example, by distillation, the product is a yellow solid containing bromine. It gives similar colour reactions in sulphuric acid to the parent compound isodinaphthylene oxide.

In practicing the invention, we prefer to employ considerably less of the β-naphthol than the di-β-naphthol, and the proportion of metal oxide or hydroxide may be small, e. g. 1–10%, though larger proportions may be employed. The metal oxide or hydroxide may be replaced wholly or in part by the corresponding metal compound of the β-naphthol or di-β-naphthol. Indeed it is quite probable that even when an oxide or hydroxide of the metal is used, it reacts first with the naphthol to produce the corresponding naphtholate. It should be understood, therefore, that in the claims below where we speak of the presence of a compound of β-naphthol with a given metal, we mean to include as its full equivalent the presence of β-naphthol and the oxide or hydroxide of the corresponding metal.

While the temperatures employed may vary within relatively wide limits we prefer to employ temperatures above about 300° C. and preferably within the range of about 300–360° C.

The process is of general application and may be employed with derivatives of di-β-naphthol having the necessary positions free. β-naphthol or derivatives of β-naphthol may be used when substituted di-β-naphthols are employed. Special mention may be made of the application of the process to the treatment of alkyl and/or halogen substituted di-β-naphthol and β-naphthol, particularly the methyl, ethyl, chlorine and bromine derivatives.

While no attempt is made to give the theory of the process, it will be observed that the formation of the isodinaphthylene oxide is very surprising since it involves the breaking of the 1:1'-linking in the di-β-naphthol and the formation of a new 1:2'-linking.

The products are valuable in the chemical industry, particularly for the production of dyes and related compounds.

As many apparent and widely different embodiments of this invention may be made without departing from the spirit thereof, it is to be understood that we do not limit ourselves to the foregoing examples or description except as indicated in the following claims.

We claim:

1. The process which comprises heating a mixture of about 30 parts of β-dinaphthol, 5 parts of β-naphthol and 1 part of calcium oxide to a temperature of about 300–345° C. for about one-half to three hours or until the reaction is substantially complete, boiling the resultant product with about 300 parts of an 8–10% caustic soda solution, and recovering the insoluble material.

2. A process for the production of 1:2'-dinaphthylene-2:3'-oxide which comprises heating 2:2'-dihydroxy-1:1'-dinaphthyl with β-naphthol in the presence of calcium oxide at a temperature within the range of about 300° C. to 360° C., the proportion of β-naphthol being less than the proportion of 2:2'-dihydroxy-1:1'-dinaphthyl and the proportion of calcium oxide being about 1% to about 10% by weight of the mixture.

G. R. CLEMO.
J. G. COCKBURN.